G. SMITH.
Duplex-Telegraph.

No. 165,263.

Patented July 6, 1875.

Witnesses
Chas H Smith
Harold Serrell

Inventor
Gerritt Smith
for Lemuel W. Serrell
attys

UNITED STATES PATENT OFFICE.

GERRITT SMITH, OF ASTORIA, NEW YORK.

IMPROVEMENT IN DUPLEX TELEGRAPHS.

Specification forming part of Letters Patent No. 165,263, dated July 6, 1875; application filed December 22, 1874.

*To all whom it may concern:*

Be it known that I, GERRITT SMITH, of Astoria, in the county of Queens and State of New York, have invented an Improvement in Duplex Telegraphs, of which the following is a specification:

I make use of two batteries, connected with the earth and with a compound key, arranged in the circuits of the line and of the receiving instrument in such a manner that the outgoing current is balanced in its action at the receiving instrument by the batteries being made to oppose each other, but which batteries act in unison on the line. One battery is smaller than the other, and its circuit is directly through the receiving instrument.

Figure 1:
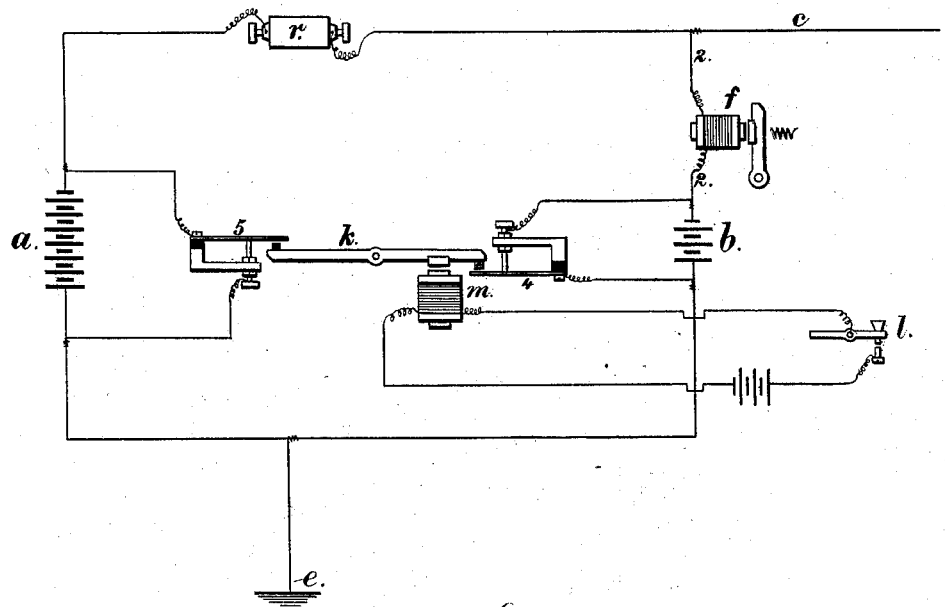
Figure 2:
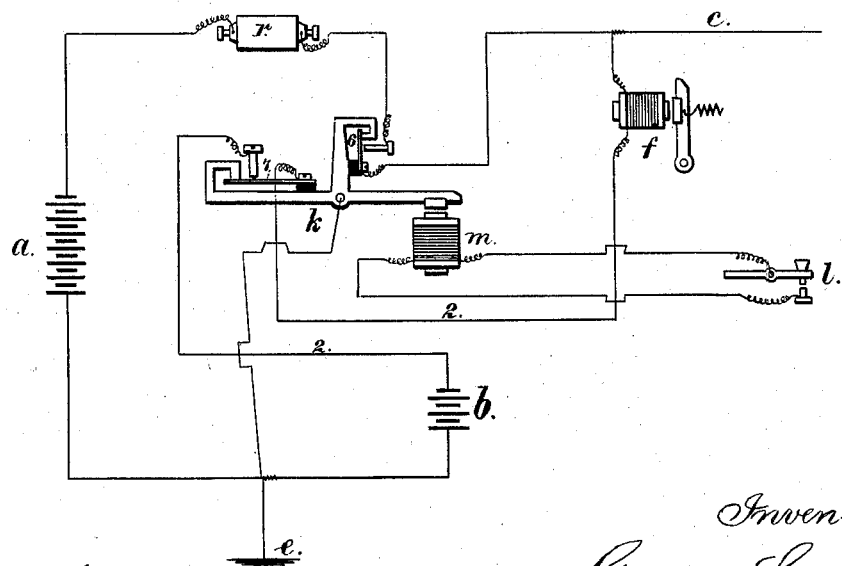

In the accompanying diagrams, Figure 1 illustrates my improvement with a simple lever-key, and Fig. 2 shows the same with the circuit-preserving key.

The battery $a$ is larger than the battery $b$, and both are connected to the line $c$ and to the earth $e$, and the receiving instrument $f$ is in the circuit 2 that passes from the battery $b$ to the line, and the adjustable rheostat $r$ is in the circuit between the battery $a$ and the line.

If the plain key $k$, shown in Fig. 1, is used, the batteries $a$ and $b$ are short-circuited through the springs 4 and 5; but if the circuit-preserving key $k$, Fig. 2, is used the circuits to the line are broken in the normal position. In either case, when the key $k$ is operated by hand, or by the electro-magnet $m$, key $l$, and local circuit, the pulsations from both batteries $a$ and $b$ are sent upon the line by closing the circuits through the springs 6 and 7, Fig. 2, or breaking the shunt-circuits at 4 and 5, Fig. 1. The pulsation sent from $a$ upon the line $c$ passes through the resistance $r$, and divides, and a portion returns through $f$ 2 $b$ to the battery $a$, and the pulsation from $b$ passes through 2 and $f$ in the opposite direction; but the pulsation from $a$ is augmented on the line by the pulsation from $b$; but the pulsation from the sending-station is neutral in its action on the receiving-magnet $f$, because the adjustment of $r$ is such that the two opposing currents in $f$ are equal, but if a pulsation is sent from the receiving-station the magnet $f$ responds, because that pulsation is not balanced.

I claim as my invention—

1. The two batteries $a$ and $b$ of unequal power, connected with the same poles to the line, in combination with the adjustable rheostat between the larger battery and the line, the receiving instrument between the smaller battery and the line, and the key for simultaneously opening and closing the circuits from both batteries, substantially as specified.

2. In a duplex telegraph the arrangement of the batteries $a$ and $b$, receiving instrument $f$, and rheostat, substantially as specified, so that the batteries shall neutralize each other at the receiving instrument, and act together on the line, substantially as set forth.

Signed by me this 18th day of December, A. D. 1874.

GERRITT SMITH.

Witnesses:
CHAS. H. SMITH,
GEO. T. PINCKNEY.